US012809659B2

(12) United States Patent
Agarwal et al.

(10) Patent No.: US 12,809,659 B2
(45) Date of Patent: Nov. 24, 2026

(54) AUTOMATED RECOVERY OF STRANDED RESOURCES WITHIN A CLOUD COMPUTING ENVIRONMENT

(71) Applicant: Microsoft Technology Licensing, LLC, Redmond, WA (US)

(72) Inventors: Saurabh Agarwal, Redmond, WA (US); Bo Qiao, Beijing (CN); Chao Du, Beijing (CN); Jayden Chen, Bellevue, WA (US); Karthikeyan Subramanian, Redmond, WA (US); Nisarg Sheth, Bothell, WA (US); Qingwei Lin, Beijing (CN); Si Qin, Beijing (CN); Thomas Moscibroda, Bellevue, WA (US); Luke Rafael Rodriguez, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 365 days.

(21) Appl. No.: 18/710,552

(22) PCT Filed: Nov. 28, 2022

(86) PCT No.: PCT/US2022/080508
§ 371 (c)(1),
(2) Date: May 15, 2024

(87) PCT Pub. No.: WO2023/102353
PCT Pub. Date: Jun. 8, 2023

(65) Prior Publication Data

US 2025/0036448 A1 Jan. 30, 2025

(30) Foreign Application Priority Data

Dec. 2, 2021 (LU) .................................. LU500944

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
CPC .................... G06F 9/45558; G06F 2009/4557
See application file for complete search history.

(56) References Cited

U.S. PATENT DOCUMENTS

| | | | | |
|---|---|---|---|---|
| 9,600,345 | B1 | 3/2017 | Cropper | |
| 2019/0026030 | A1 * | 1/2019 | Yang | G06F 3/0649 |
| 2021/0149743 | A1 | 5/2021 | Chen | |

FOREIGN PATENT DOCUMENTS

| | | | |
|---|---|---|---|
| CN | 110493317 | A | 11/2019 |

OTHER PUBLICATIONS

Decision to grant a European patent pursuant to Article 97(1) received in European Application No. 22821827.7 mailed on Jan. 8, 2026, 2 pages.

(Continued)

*Primary Examiner* — Wissam Rashid
(74) *Attorney, Agent, or Firm* — Workman Nydegger

(57) ABSTRACT

The present application is directed to stranded resource recovery in a cloud computing environment. A resource utilization signal at each of a plurality of nodes that each hosts corresponding virtual machines (VMs) is measured. Based on each resource utilization signal, a set of candidate nodes is identified. Each candidate node comprises a stranded resource that is unutilized due to utilization of a bottleneck resource. The identification includes calculating an amount of the stranded resource at each candidate node. From a plurality of VMs hosted at the set of candidate nodes, a set of candidate VMs is identified for migration for stranded resource recovery. The identification includes calculating a score for each candidate VM based on a degree of imbalance between the stranded resource and the bottleneck (Continued)

resource at a candidate node hosting the candidate VM. Migration of at least one candidate VM in the set of candidate VMs is initiated.

20 Claims, 5 Drawing Sheets

(56) References Cited

OTHER PUBLICATIONS

Communication under Rule 71(3) EPC, Received in European Patent Application No. 22821827.7, mailed on Oct. 2, 2025, 09 pages.
International Search Report and Written Opinion received for PCT Application No. PCT/US22/080508 Jan. 19, 2023, 12 pages.
Search Report Issued in Luxemburg Patent Application No. LU500944, Sep. 7, 2022, 10 pages.
First Examination Report Received for Indian Application No. 202417041263, mailed on Feb. 27, 2026, 10 pages.

* cited by examiner

AUTOMATED RECOVERY OF STRANDED RESOURCES WITHIN A CLOUD COMPUTING ENVIRONMENT

CROSS-REFERENCE TO RELATED APPLICATIONS

The present application is a U.S. National Stage of International Application No. PCT/US2022/080508, filed on 28 Nov. 2022, designating the United States and claiming the priority of Luxembourg Patent Application No. LU500944 filed with the Luxembourg Intellectual Property Office on 2 Dec. 2021. All of the aforementioned applications are incorporated herein in their respective entirety by this reference.

TECHNICAL FIELD

The present disclosure relates to systems, methods, and devices that manage resource utilization within a cloud computing environment.

BACKGROUND

Computer systems and related technology affect many aspects of society. Indeed, the computer system's ability to process information has transformed the way we live and work. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments, such as cloud computing environments. Cloud computing environments may comprise one or more systems that each includes one or more computing nodes (e.g., computer systems operating as servers/hosts). Each node is capable of hosting one or more virtual machines (VMs). In general, a VM provides an isolated environment within which one or more applications execute, potentially along with a supporting operating system. Each node includes an abstraction layer, such as a hypervisor, which provides one or more VMs access to physical resources of the node in an abstracted manner (e.g., by emulating virtual resources for hosted VMs), and which provides isolation between the VMs. For example, from the perspective of any given VM, a hypervisor provides the illusion that the VM is interfacing with a physical resource, even though the VM only interfaces with the appearance (e.g., a virtual resource) of a physical resource. Examples of physical resources include processing capacity (e.g., central processing unit cores), memory, disk space, network bandwidth, media drives, and so forth.

BRIEF SUMMARY

Cloud computing environments are subject to fragmentation of the available resources within the nodes making up the cloud computing environment. One form of fragmentation is the stranding of node resources due to resource bottlenecks. In particular, depending on which one or more virtual machines (VMs) are allocated to a node, and depending on resource requirements of those VM(s), it is possible that one or more of the node's resources cannot be fully used and is thus "stranded." In particular, when one "bottleneck" resource is fully or nearly fully consumed by the allocated VM(s), allocations of an additional VM to the node may be blocked, causing a "stranded" resource at the node to remain unused, hence wasting that resource.

At least some embodiments described herein use measurements of node resources within a cloud computing environment to identify VM hosting nodes that have stranded resources. In embodiments, measurements include an amount of available memory at a node, a number of unallocated CPU cores or unused CPU cycles at a node, an amount of available disk space at a node, an amount of available network bandwidth at a node, and the like. These embodiments then initiate migration of one or more VMs away from these hosting nodes, thereby making these stranded resources available for VM allocations or other purposes. By doing so, the embodiments described herein automatically and proactively reduce the stranded resources within cloud computing environments. In one example, a stranded resource is a resource of a first type (e.g., memory) on a hosting node which is prevented from being used for VM deployment due to insufficient available resource of a second type (e.g., processing capacity) at the hosting node. Since deploying a VM involves using both memory and processing capacity, lack of one of these types of resource means that it is not possible to deploy a VM and the remaining available resource of the other type is "stranded." The type of resource which is insufficiently available for VM deployment is referred to as a bottleneck resource.

Technical effects of the embodiments herein include an improved efficiency of resource utilization within cloud computing environments, an increased capacity of cloud computing environments (e.g., with fewer stranded resources, a given number of nodes are able to serve an increased VM demand than otherwise possible), a lower power consumption by cloud computing environments, a lower carbon footprint for cloud computing environments, and improved reliability of cloud computing environments (e.g., through a reduction in capacity-related VM allocation failures).

In some aspects, the techniques described herein relate to a method, implemented by a computer system that includes a processor, for recovery of stranded resources within a cloud computing environment, the method including: measuring a corresponding resource utilization signal at each of a plurality of nodes that each hosts at least one corresponding VM; based on each corresponding resource utilization signal, identifying a set of candidate nodes, each candidate node including a corresponding stranded resource that is unutilized due to utilization of a corresponding bottleneck resource at the candidate node, including calculating an amount of the corresponding stranded resource at each candidate node; from a plurality of VMs hosted at the set of candidate nodes, identifying a set of candidate VMs for migration for stranded resource recovery, including calculating a score for each candidate VM based on a degree of imbalance between the corresponding stranded resource and the corresponding bottleneck resource at a candidate node hosting the candidate VM; and initiating migration of at least one candidate VM in the set of candidate VMs.

In some aspects, the techniques described herein relate to a computer system for recovery of stranded resources within a cloud computing environment, the computer system including: a processor; and a computer storage media that stores computer-executable instructions that are executable by the processor to cause the computer system to at least: measure a corresponding resource utilization signal at each of a plurality of nodes that each hosts at least one corresponding VM; based on each corresponding resource utilization signal, identify a set of candidate nodes, each candidate node including a corresponding stranded resource that is unutilized due to utilization of a corresponding bottleneck resource at the candidate node, including calculating an amount of the corresponding stranded resource at each candidate node; from a plurality of VMs hosted at the set of candidate nodes, identify a set of candidate VMs for migration for stranded resource recovery, including calculating a score for each candidate VM based on a degree of imbalance between the corresponding stranded resource and the corresponding bottleneck resource at a candidate node hosting the candidate VM; and initiate migration of at least one candidate VM in the set of candidate VMs.

In some aspects, the techniques described herein relate to a computer storage media for recovery of stranded resources within a cloud computing environment, the computer storage media storing computer-executable instructions that are executable by a processor to cause a computer system to at least: measure a corresponding resource utilization signal at each of a plurality of nodes that each hosts at least one corresponding VM; based on each corresponding resource utilization signal, identify a set of candidate nodes, each candidate node including a corresponding stranded resource that is unutilized due to utilization of a corresponding bottleneck resource at the candidate node, including calculating an amount of the corresponding stranded resource at each candidate node; from a plurality of VMs hosted at the set of candidate nodes, identify a set of candidate VMs for migration for stranded resource recovery, including calculating a score for each candidate VM based on a degree of imbalance between the corresponding stranded resource and the corresponding bottleneck resource at a candidate node hosting the candidate VM; and initiate migration of at least one candidate VM in the set of candidate VMs.

In some aspects of the techniques described herein, each corresponding resource utilization signal indicates utilization of at least one of: a memory resource, a central processing unit resource, a disk resource, a network resource, or a platform resource.

In some aspects of the techniques described herein, identifying the set of candidate nodes also includes: identifying, from the plurality of nodes, at least one first node that is included on an allow list or a block list; and excluding the at least one first node from the set of candidate nodes.

In some aspects of the techniques described herein, identifying the set of candidate nodes also includes: determining, from the plurality of nodes, at least one second node whose corresponding stranded resource is temporarily stranded; and excluding the at least one second node from the set of candidate nodes.

In some aspects of the techniques described herein, identifying the set of candidate nodes also includes sorting the set of candidate nodes based on the amount of the corresponding stranded resource at each candidate node.

In some aspects of the techniques described herein, identifying the set of candidate VMs also includes: identifying, from the plurality of VMs hosted at the set of candidate nodes, at least one first VM as being a priority VM; and excluding the at least one first VM from the set of candidate VMs.

In some aspects of the techniques described herein, identifying the set of candidate VMs also includes: identifying, from the plurality of VMs hosted at the set of candidate nodes, at least one second VM as being a short-lived VM; and excluding the at least one second VM from the set of candidate VMs.

In some aspects of the techniques described herein, identifying the set of candidate VMs also includes sorting the set of candidate VMs based on the score for each candidate VM.

In some aspects of the techniques described herein, identifying the set of candidate VMs also includes limiting a number of candidate VMs in the set of candidate VMs based on having sorted the set of candidate VMs.

In some aspects of the techniques described herein, initiating migration of at least one candidate VM in the set of candidate VMs includes selecting the at least one candidate VM for migration based on having sorted the set of candidate VMs.

In some aspects of the techniques described herein, initiating migration of at least one candidate VM in the set of candidate VMs includes migrating the at least one candidate VM from a first node of the plurality of nodes to a second node of the plurality of nodes.

In some aspects of the techniques described herein, initiating migration of at least one candidate VM in the set of candidate VMs includes delaying the migration until a node maintenance event.

Some aspects of the techniques described herein further include tracking a stranded resource metric across the plurality of nodes.

In some aspects of the techniques described herein, identifying the set of candidate nodes also includes at least one of: considering a first resource configuration of a first individual VM that is queued for allocation within the plurality of nodes; considering a second resource configuration of a second individual VM that is predicted for allocation within the plurality of nodes; considering a third resource configuration of a first set of a plurality of VMs that is queued for allocation within the plurality of nodes; or considering a fourth resource configuration of a second set of a plurality of VMs that is predicted for allocation within the plurality of nodes.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Fragmentation is a factor that drives efficiency of cloud computing environments. Fragmentation in cloud computing environments can happen due to a myriad of reasons (e.g., due to how a virtual machine (VM) allocator allocates the various VMs into existing nodes, due to customers organically deleting VMs and leaving fragmented cores on nodes, due to platform constraints such as dedicated hosts). One way to mitigate fragmentation in cloud computing environments is to migrate VMs between nodes, in order to pack those VMs into fewer nodes and create empty nodes onto which new VMs can be allocated.

The inventors have recognized that one mode in which fragmentation manifests in cloud computing environments is via stranding of node resources. Each node has a specific configuration of available resources, such as central processing unit (CPU) cores, memory resources, disk resources, and the like. Additionally, some VMs may have a corresponding requirement for those resources. For example, a VM may need to be allocated a certain number of CPU cores, a certain amount of memory, a certain amount of disk space or input/output (IO) bandwidth, etc. Thus, depending on which VM (or VMs) are allocated to a particular node, it is possible that one or more of the node's resources cannot be fully utilized because one or more bottleneck resources block further allocations of VMs to the node, which strands one or more unused or unallocated resources at the node.

Figure 1A:
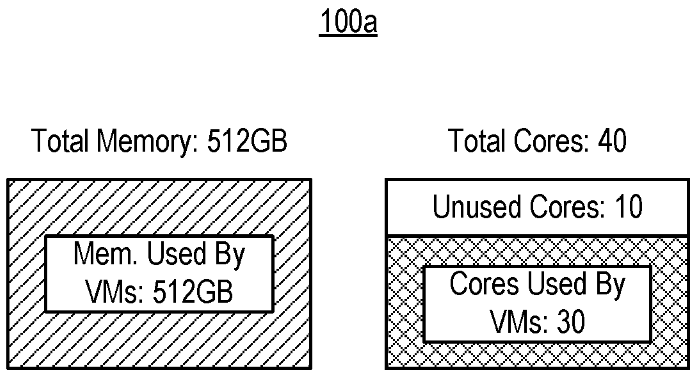
FIG. 1A illustrates an example of a fully exhausted memory resource as a bottleneck resource causing a stranded central processing unit (CPU) resource.
Figure 1B:
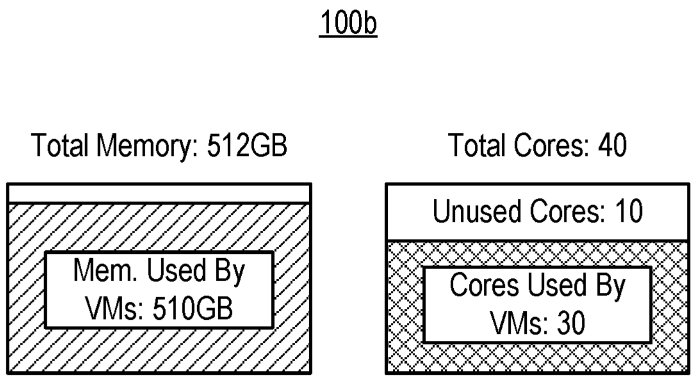
FIG. 1B illustrates an example of an almost exhausted memory resource as a bottleneck resource causing stranded CPU resources.

In one example, one or more VMs with relatively high required memory-to-cores ratios are allocated to a node, which fully utilizes the memory on the node while leaving unused CPU cores on the node. FIG. 1A, for example, illustrates an example 100*a* of a fully exhausted memory resource as a bottleneck resource causing a stranded CPU resource. In particular, example 100*a* shows a node that has 512 GB of total memory, with this memory being fully utilized by VMs hosted at the node. However, the node also has 40 CPU cores, and only 30 of those cores are utilized by the VMs hosted at the node. In this case, memory is a bottleneck resource that prevents the node from accepting more VMs, and the unused CPU cores are therefore rendered "stranded." Notably, a resource need not be fully exhausted to be a bottleneck resource. FIG. 1B, for example, illustrates an example 100*b* of an almost exhausted memory resource as a bottleneck resource causing stranded CPU resources. In particular, example 100*b* shows a node that has 512 GB of total memory and 40 CPU cores, with 2 GB of unallocated memory and 10 unallocated cores. Here, even though the node's memory is not fully utilized, the remaining memory may be insufficient to enable allocation of an additional VM at the node (e.g., the smallest memory needed by any VM is 8 GB), leading to stranded CPU cores.

In another example, one or more VMs allocated to a node fully utilize the CPU cores of the node and unused memory is rendered stranded. The resources on a node may also be stranded due to certain platform constraints. For example, there may be a platform limit on the number of VMs that can be hosted on a given node, and it is possible that a node may be hosting the maximum number of allowed VMs—stranding unused CPU cores, memory, disk space, etc.

At least some embodiments described herein use measurements of node resources within a cloud computing environment to identify VM hosting nodes that have stranded resources. These embodiments then initiate migration of VMs causing resource bottlenecks away from those hosting nodes, thereby making previously stranded resources available for VM allocations or other purposes. By doing so, the embodiments described herein automatically and proactively reduce the stranded resources within cloud computing environments.

As such, the embodiments herein improve the efficiency of resource utilization within cloud computing environments. Since the stranded resources effectively lead to lowering the available capacity of a given set of nodes within a cloud computing environment, the improved resource utilization efficiency enabled by the embodiments herein leads to an overall capacity increase of the cloud computing environment, enabling a fewer number of nodes to serve a given VM demand. This leads to lower power consumption by the cloud computing environment, and a lower carbon footprint for the cloud computing environment. Additionally, in some cases, stranding of resources can cause capacity-related VM allocation failures. Thus, the improved resource utilization efficiency enabled by the embodiments herein can improve reliability of the cloud computing environment.

Figure 2:
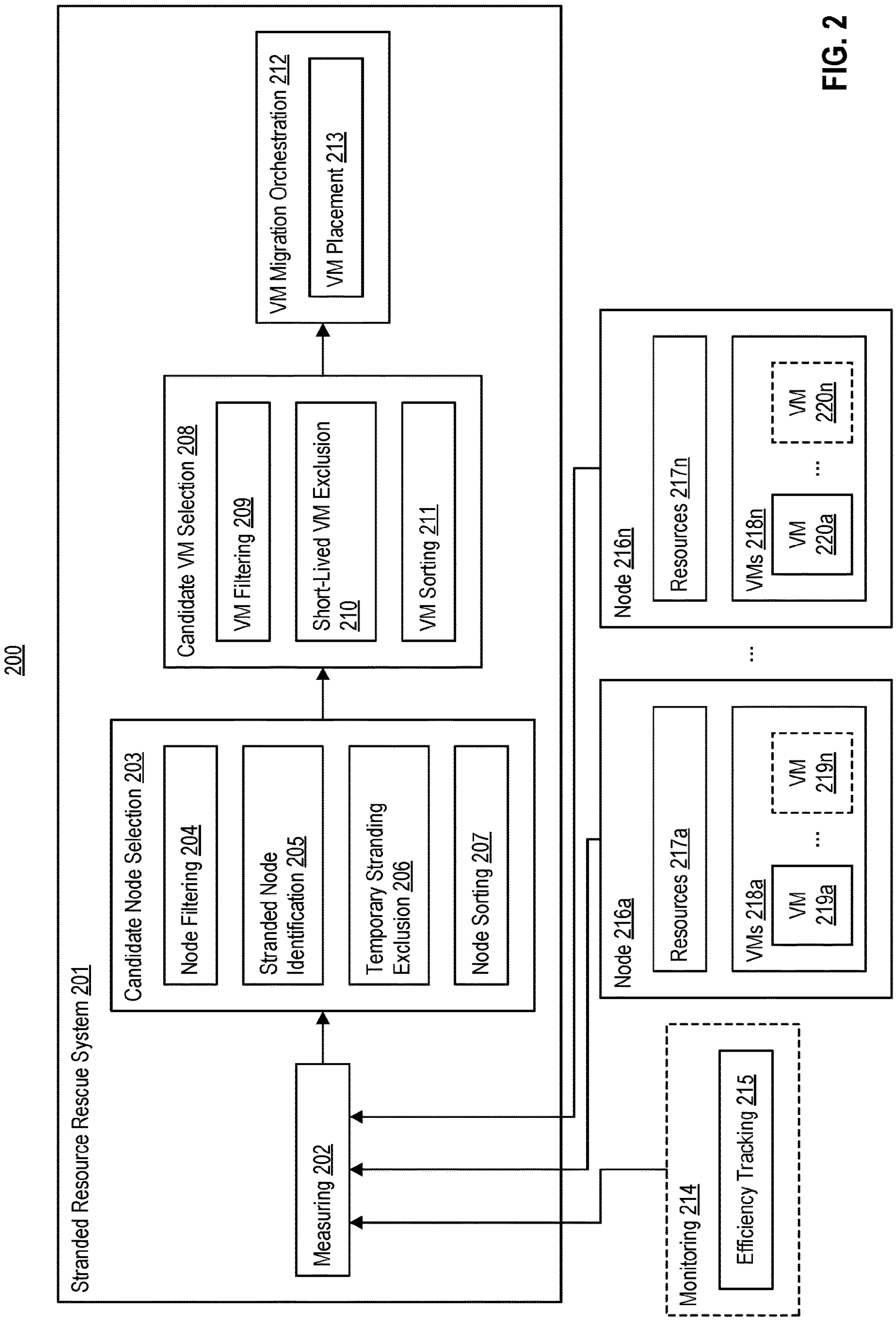
FIG. 2 illustrates an example computer architecture that facilitates automated recovery of stranded resources within a cloud computing environment.

FIG. 2 illustrates an example computer architecture 200 that facilitates automated recovery of stranded resources within a cloud computing environment. As shown, computer architecture 200 includes a stranded resource rescue system 201 (rescue system 201) that recovers stranded resources within a plurality of nodes 216 (i.e., node 216*a* to node 216*n*) of one or more cloud computing environments (e.g., one or more datacenters). Each of nodes 216 includes resources 217 (i.e., resources 217*a* in node 216*a*, resources 217*n* in node 216*n*, etc.). In embodiments, resources 217 comprise memory resources, CPU resources (e.g., CPU cores), disk resources (e.g., storage and I/O), network resources, and the like. Additionally, each of nodes 216 is a VM hosting node that hosts one or more VMs 218 (i.e., VMs 218*a* hosted by node 216*a*, including VM 219*a* to VM 219*n*; VMs 218*n* hosted by node 216*n*, including VM 220*a* to VM 220*n*; etc.). Although not illustrated, in embodiments the nodes 216 are logically arranged into different clusters of nodes that are at least partially managed as a group.

As used herein, a "virtual machine" (VM) is any isolated execution environment, such as an emulated execution environment created by an emulator (e.g., BOCHS, QEMU), a virtualized execution environment created by a hypervisor (e.g., HYPER-V, XEN, KVM), a user-space instance (e.g., container, zone, partition, jail) created via OS-level virtualization, and the like.

In embodiments, the rescue system 201 uses measurements of resource utilization at the nodes 216 to proactively identify and recover stranded resources among the resources 217 of the nodes 216. As non-limiting examples only, in one embodiment the rescue system 201 rescues stranded CPU cores on one or more of nodes 216 where the VMs 218 hosted at 30) those nodes have utilized all or almost all the node's memory; in another embodiment the rescue system 201 rescues stranded memory on a node where the VMs 218 hosted at those nodes have utilized all or almost all the node's CPU cores; in another embodiment the rescue system 201 rescues stranded CPU cores on a node where the VMs 218 hosted at those nodes have hit or approached a limit on a maximum number of VMs that a cloud computing environment can support on a given node; and in another embodiment the rescue system 201 rescues stranded CPU cores where the VMs 218 hosted at those nodes have utilized all or almost all the node's available disk space.

In embodiments, the rescue system 201 operates in a fully- or semi-automatic manner, such as through a cloud or datacenter management fabric. For instance, in one embodiment the rescue system 201 operates continuously in the background and has configurable settings to run live migrations, such as a live migration on N nodes every M minutes.

As mentioned, the rescue system 201 uses measurements of resource utilization at the nodes 216. Thus, as shown, the rescue system 201 includes a measuring component 202 that collects signals regarding utilization of resources 217 at the nodes 216. In some embodiments, the measuring component 202 actively (e.g., via probing of the nodes 216) or passively (e.g., via listening to signal emitted by the nodes 216) collects these signals by directly communicating with each of nodes 216. In additional, or alternative, embodiments, the measuring component 202 collects these signals indirectly via a monitoring component 214 which, in embodiments, monitors overall stranded resources across one or more cloud computing environments. In embodiments, measurements include information sufficient to determine an amount of available memory at a node, a number of unallocated CPU cores or unused CPU cycles at a node, an amount of available disk space at a node, an amount of available network bandwidth at a node, and the like.

Figure 3:
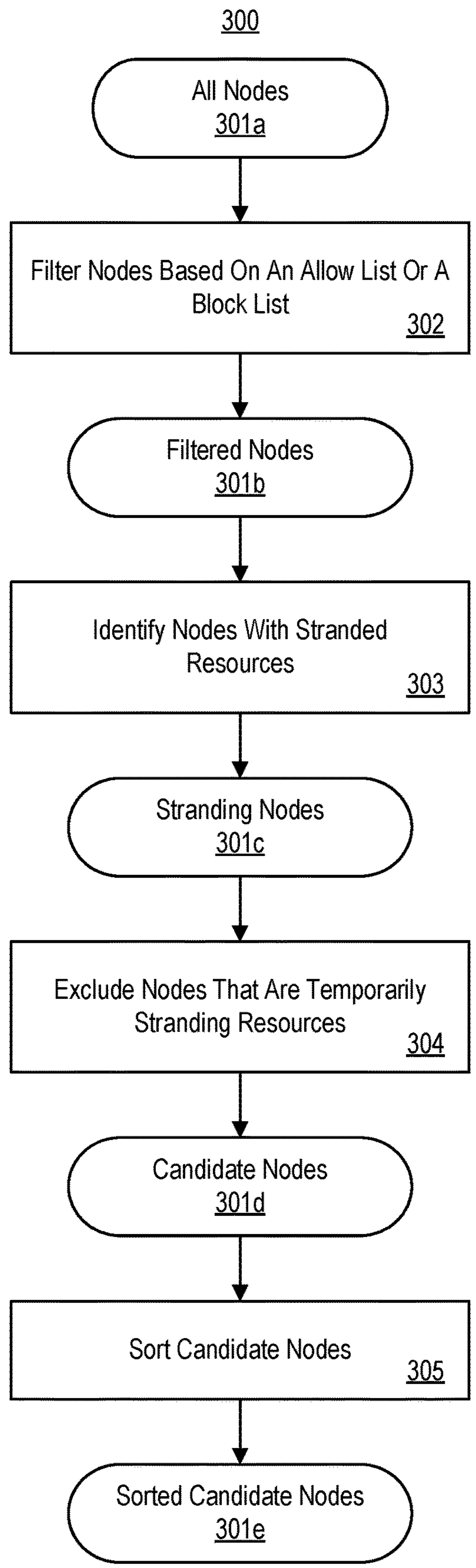
FIG. 3 illustrates an example process flow for candidate node selection.

Based on the signals measured by the measuring component 202, the rescue system 201 uses a candidate node selection component 203 to intelligently identify one or more nodes of the nodes 216 that currently have one or more stranded resources that are unutilized due to utilization of a corresponding bottleneck resource at the node. In embodiments, a stranded resource is stranded by utilization of a corresponding bottleneck resource due to the bottleneck resource being fully utilized (i.e., exhausted) at the node, such as in FIG. 1A where a fully exhausted memory resource creates a stranded CPU resource. In embodiments, a stranded resource is stranded by utilization of a corresponding bottleneck resource due to the bottleneck resource being almost fully utilized (e.g., 70% utilized, 90% utilized, etc.) at the node, such as in FIG. 1B where an almost exhausted memory resource creates a stranded CPU resource. These nodes become a set of candidate nodes, from which one or more VMs are subsequently migrated in order to rescue those stranded resources. Example operation of the candidate node selection component 203 is now described in reference to FIG. 3, which illustrates an example process flow 300 for candidate node selection.

In some embodiments, the candidate node selection component 203 includes a node filtering component 204. In embodiments, the node filtering component 204 excludes one or more of nodes 216 from further consideration by the candidate node selection component 203. For instance, the candidate node selection component 203 may operate to exclude certain nodes from further consideration due to platform constraints. In one example, the node filtering component 204 excludes any of nodes 216 that are not identified from an allow list, and in another example the node filtering component 204 excludes any of nodes 216 that are identified from a block list. In some embodiments, the node filtering component 204 operates at a cluster level, to exclude clusters of a plurality of nodes from further consideration by the candidate node selection component 203. Thus, in embodiments, an allow or a block list refers to nodes directly, and/or to clusters of nodes.

Referring to process flow 300, after operation of the node filtering component 204 at step 302 (filter nodes based on an allow list or a block list), a set 301*a* of all nodes (e.g., nodes 216) becomes a set 301*b* of filtered nodes. It will be appreciated that, in some embodiments, the node filtering component 204 is excluded from the node selection component 203, and/or step 302 is omitted from process flow 300.

The candidate node selection component 203 also includes a stranded node identification component 205. In embodiments, the stranded node identification component 205 applies one or more rules or heuristics to signals gathered by the measuring component 202 to determine if one or more of nodes 216 have one or more stranded resources. In one example, the stranded node identification component 205 identifies resource A (a stranded resource) as being stranded by resource B (a bottleneck resource) on a particular node when the following evaluates to true:

$$((1-\text{Utilization\_of\_B})*\text{Stranding\_Ratio})<(1-\text{Utilization\_of\_A})\ \&\&\ (\text{Utilization\_of\_A}<\text{Stranding\_Threshold})$$

where:

Utilization_of_A is the used portion of resource A as percent of total resource A on the node, Utilization_of_B is the used portion of resource B as percent of total resource B on the node, Stranding_Ratio is a parameter greater than 1 (e.g., 8), and Stranding_Threshold is a parameter between 0 and 1 (e.g., 0.9).

In embodiments, if the stranded node identification component 205 identifies resource A as a stranded resource on a node, then the stranded node identification component 205 calculates an amount of the resource stranded on the node as follows:

$$1-\text{Utilization\_of\_}A$$

In a particular, for inferring if a node has stranded CPU cores due to memory being full, signals indicating CPU cores utilization and memory utilization on the node can be used to consider the node as stranding cores due to memory full if the below quantity evaluates to true:

$$((1-MemoryUtilization)*8)<(1-CoresUtilization)\ \&\&\ (CoresUtilization<0.9)$$

where:

MemoryUtilization is the node's used memory as percent of total memory on the node, and CoresUtilization is the node's used CPU cores as percent of total CPU cores on the node.

In embodiments, when determining if one or more of nodes 216 have one or more stranded resources, the stranded node identification component 205 considers attributes of one or more VMs that are, or that could be, allocated one or more of nodes 216. In one example, the stranded node identification component 205 considers an available VM template definition that defines, e.g., an amount of memory, a number of CPU cores, etc. required for a VM instantiated based on the VM template definition. In another example, the stranded node identification component 205 considers a set of potential VMs that are valid to place on one or more of nodes 216 (e.g., due to policy, contractual, security, or other reasons). In another example, the stranded node identification component 205 considers current set of VMs (including the resources required by those VMs) that are queued for placement. In another example, the stranded node identification component 205 considers a predicted set of VMs that will need to be generated in an upcoming time period (e.g., hour, N hours, etc.). In embodiments, the stranded node identification component 205 considers combinations of one or more of the foregoing.

In embodiments, the stranded node identification component 205 considers a plurality of VMs as a set, in addition to (or rather than) individually. In one example, the stranded node identification component 205 operates to identify a resource as being stranded when it prevents allocation of the set of VMs as a whole, even if that resource may be sufficient to enable allocation of one of the VMs of the set individually. In another example, the stranded node identification component 205 operates to identify a resource as being stranded when there is a customer requirement to only run the plurality of VMs on the same physical machine (e.g., due to high security or classification).

Referring to process flow 300, after operation of the candidate node selection component 203 at step 303 (identify nodes with stranded resources), the set 301*b* of filtered nodes becomes a set 301*c* of stranding nodes.

In some embodiments, the candidate node selection component 203 also includes a temporary stranding exclusion component 206. In embodiments, the temporary stranding exclusion component 206 excludes one or more nodes that are only temporarily stranding resources. For example, the temporary stranding exclusion component 206 may only consider a node to be a stranding node when the majority of VMs hosted on node are considered as "long running" VMs (e.g., having already run longer than a predetermined number of minutes, hours, days, etc.). Thus, the temporary stranding exclusion component 206 excludes a node if a majority of VMs at the node are considered to be short-lived (i.e., not long running). In some embodiments, the temporary stranding exclusion component 206 applies the following rule to check whether the "majority" rule is satisfied for a node:

Utilization_of_Bottleneck_Resource_Used_by_long_running_VMs >= Majority_Threshold where:

Utilization_of_Bottleneck_Resource_Used_by_long_running_VMs is the amount of bottleneck resource used by all long running VMs as percent of the total amount of bottleneck resource on the node, and Majority_Threshold is a percentage parameter (e.g., 75%).

Referring to process flow 300, after operation of the temporary stranding exclusion component 206 at step 304 (exclude nodes that are temporarily stranding resources), the set 301*c* of stranding nodes becomes a set 301*d* of candidate nodes. It will be appreciated that, in some embodiments, the temporary stranding exclusion component 206 is excluded from the node selection component 203, and/or step 304 is omitted from process flow 300.

In some embodiments, the candidate node selection component 203 also includes a node sorting component 207. In embodiments, the node sorting component 207 sorts the set of candidate nodes by an amount of resource stranded at each node. In embodiments, the node sorting component 207 sorts the set of candidate nodes in descending order (i.e., to create an ordered set of candidate nodes), such that the node sorting component 207 sorts a first node with a higher amount of stranded resource prior to (or higher than) a second node with a lower amount of stranded resource. As a result of this sorting, the first node is given higher priority for VM migration than the second node.

Referring to process flow 300, after operation of the node sorting component 207 at step 305 (sort candidate nodes), the set 301*d* of candidate nodes becomes a set 301*e* of sorted candidate nodes. It will be appreciated that, in some embodiments, the node sorting component 207 is excluded from the candidate node selection component 203 and/or step 305 is omitted from process flow 300.

Figure 4:
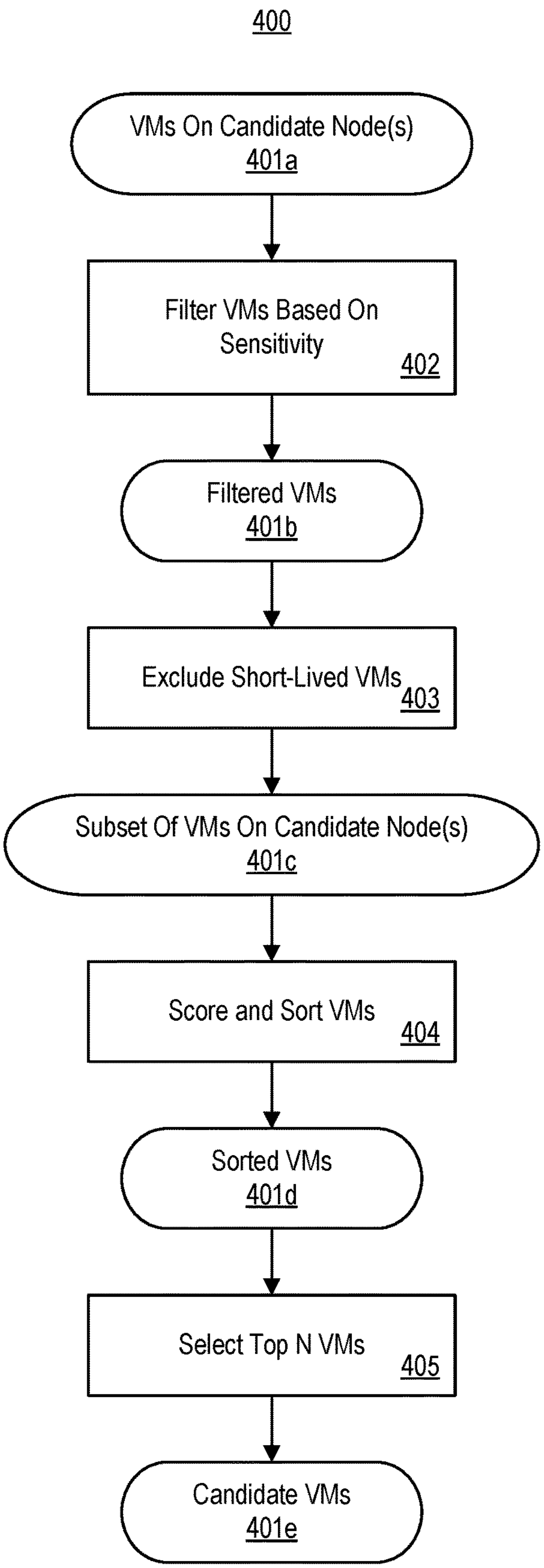
FIG. 4 illustrates an example process flow for candidate virtual machine selection.

Based on the set of candidate nodes (e.g., set 301*d*) identified by the candidate node selection component 203, the rescue system 201 uses a candidate VM selection component 208 to intelligently identify one or more "bottleneck" VMs on those candidate nodes that can be migrated from those candidate nodes in order to rescue stranded resources. These VMs become a set of candidate VMs, at least one of which is subsequently migrated from its respective candidate node in order to rescue stranded resources at that node. Example operation of the candidate VM selection component 208 is now described in reference to FIG. 4, which illustrates an example process flow 400 for candidate VM selection. In various embodiments, process flow 400 is applied to all nodes in a set of candidate nodes (e.g., set 301*d*) at once, or is applied to each node in the set of candidate nodes individually.

In some embodiments, the candidate VM selection component 208 includes a VM filtering component 209. In embodiments, the VM filtering component 209 excludes one or more VMs hosted by the candidate node(s) from being selected as candidates for migration based on one or more filtering criteria. The criteria used by the VM filtering component 209 can vary, but in embodiments, the VM filtering component 209 excludes VMs that are considered to be sensitive, such as based on a type of workload executed on those VMs (e.g., which may be adversely affected by a VM migration), based on a service-level agreement with a customer to whom the VMs is associated, etc.

Referring to process flow 400, after operation of the VM filtering component 209 at step 402 (filter VMs based on sensitivity), a set 401*a* of VMs on candidate node(s) becomes a set 401*b* of filtered VMs. It will be appreciated that, in some embodiments, the VM filtering component 209 is excluded from the candidate VM selection component 208 and/or step 402 is omitted from process flow 400.

In some embodiments, the candidate VM selection component 208 also includes a short-lived VM exclusion component 210. In embodiments, the short-lived VM exclusion component 210 excludes one or more VMs that are short-lived from being candidates for migration. For example, the short-lived VM exclusion component 210 may consider a VM to be short-lived if it has been running for less than a predetermined number of minutes, hours, days, etc. In embodiments, exclusion of short-lived VMs from migration reduces the downtime for short-lived VMs that might be otherwise organically deleted by the VM's owner.

Referring to process flow 400, after operation of the short-lived VM exclusion component 210 at step 403 (exclude short-lived VMs), the set 401*b* of filtered VMs becomes a set 401*c* of a subset of VMs on candidate node(s).

It will be appreciated that, in some embodiments, the short-lived VM exclusion component 210 is excluded from the candidate VM selection component 208 and/or step 403 is omitted from process flow 400.

In some embodiments, the candidate VM selection component 208 also includes a VM sorting component 211. In embodiments, the VM sorting component 211 scores one or more sets of candidate VMs based on a scoring function. In an example, the VM sorting component 211 uses a scoring function that measures a degree of imbalance between a stranded resource at the node and a bottleneck resource used by at least one VM at the node. This measurement quantifies the contribution of individual VMs to causing the stranding of the stranded resource on the node. For example, for a scenario where one or more of a node's CPU cores are stranded due to the node's memory being full, the migration of a VM whose memory utilization exceeds the CPU core utilization at a greater level than another VM has the strongest effect in rescuing the stranded CPU core(s). In embodiments, this scoring function is defined as:

Utilization_of_Bottleneck_Resource-Utilization_of-_Stranded_Resource where:

- Utilization_of_Bottleneck_Resource is the used bottleneck resource by each VM as percentage of total "bottleneck resource" on the node, and
- Utilization_of_Stranded_Resource is the used stranded resource by each VM as percentage of total "stranded resource" on the node.

In embodiments, the VM sorting component 211 also sorts the VMs in descending order based on each VM's score. In some embodiments, the VM sorting component 211 sorts VMs across all candidate nodes. In other embodiments, the VM sorting component 211 sorts VMs at each candidate node. Referring to process flow 400, after operation of the VM sorting component 211 at step 404 (score and sort VMs), the set 401*c* of a subset of VMs on candidate node(s) becomes a set 401*d* of sorted VMs.

In embodiments, the VM sorting component 211 also selects the N highest scored VMs (with positive values) as a set of candidate VMs for migration. Referring to process flow 400, after operation of the VM sorting component 211 at step 404 (select top N VMs), a set 401*d* of sorted VMs becomes a set 401*e* of candidate VMs (e.g., at a particular node, or across all candidate nodes). It will be appreciated that, in some embodiments, the VM sorting component 211 is excluded from the candidate VM selection component 208 and/or one or more of step 404 or step 405 is omitted from process flow 400.

Based on the set of VMs (e.g., set 401*e*) identified by the candidate VM selection component 208, the rescue system 201 uses a VM migration orchestration component 212 to determine at least one of the candidate VMs that is to be migrated away from its hosting node. In embodiments, the VM migration orchestration component 212 initiates that migration using a VM placement component 213. In embodiments, the VM migration orchestration component 212 prioritizes migration of VMs based on the sorted order created by the VM sorting component 211.

In some embodiments, the VM migration orchestration component 212 delays migrations until node maintenance events (e.g., operating system updates, node reboots, etc.) in order to opportunistically piggyback on those maintenance events to achieve rescue of stranded resources, while not causing an additional VM downtime than would otherwise be incurred by the maintenance.

In some embodiments, the VM migration orchestration component 212 includes a configurable safeguard that ensures that there is a maximum number of parallelly executing VM migrations per cluster at any given time.

As mentioned, in some embodiments the measuring component 202 collects signals regarding resource utilization at the nodes 216 indirectly via a monitoring component 214, and that the monitoring component 214, monitors overall stranded resources across one or more cloud computing environments. As shown, in embodiments, the monitoring component 214 also includes an efficiency tracking component 215. In embodiments the efficiency tracking component 215 tracks resource utilization efficiency among at least the nodes 216 of computer architecture 200, such as by tracking a percentage of stranded resources across the nodes 216. In embodiments, the monitoring component 214 communicates resource utilization efficiency information to the rescue system 201, and the rescue system 201 uses this information to ensure that the nodes 216 are operating within target stranded resource limits.

Figure 5:
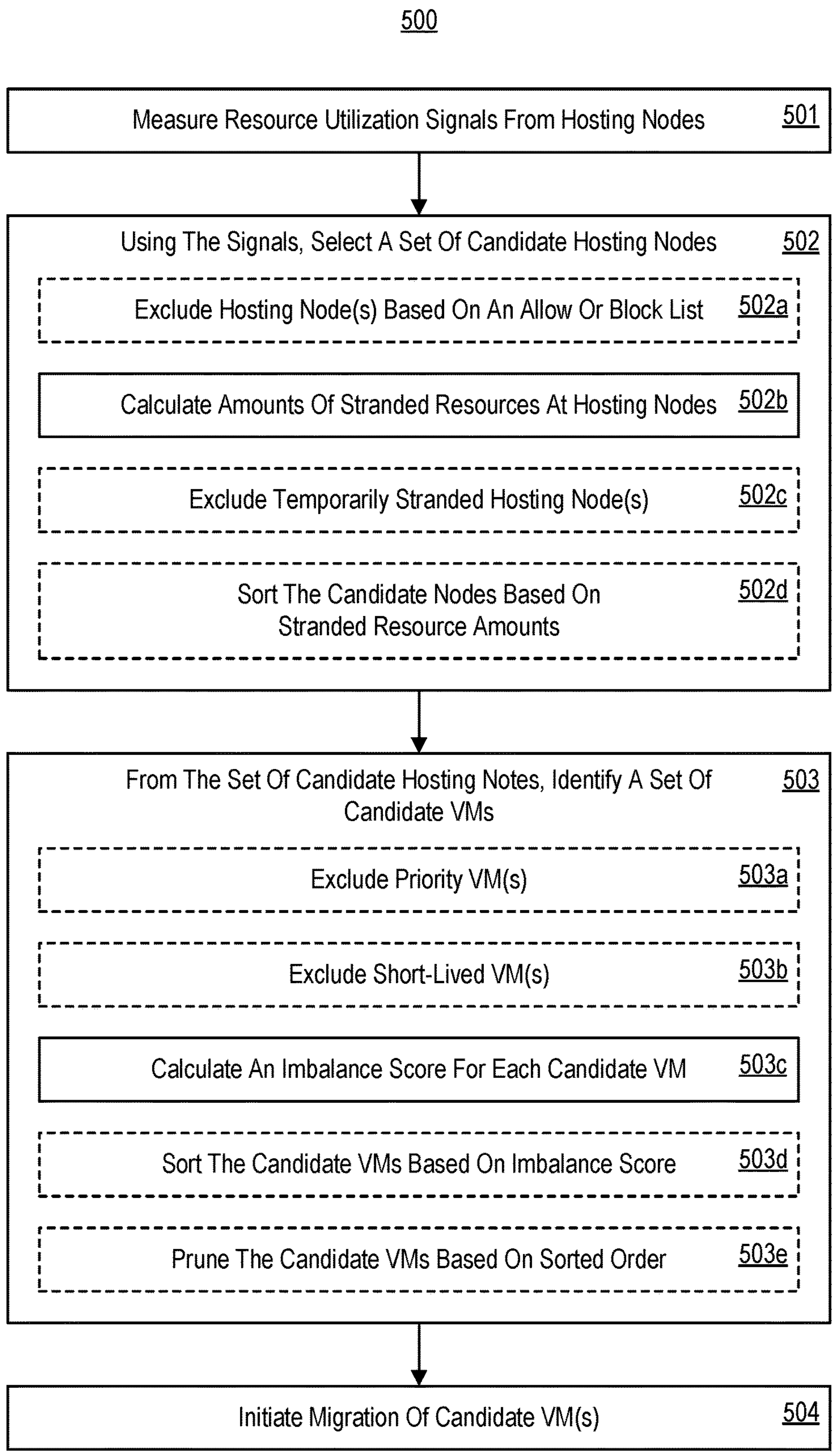
FIG. 5 illustrates a flow chart of an example method for recovery of stranded resources within a cloud computing environment.

A further description of the computer architecture 200 is now provided in connection with FIG. 5, which illustrates a flow chart of an example method 500 for recovery of stranded resources within a cloud computing environment. In embodiments, instructions for implementing method 500 are encoded as computer-executable instructions stored on a computer program product (e.g., a computer storage media) that are executable by a processor to cause a computer system (e.g., rescue system 201) to perform method 500.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Referring to FIG. 5, in embodiments, method 500 comprises an act 501 of measuring resource utilization signals from hosting nodes. In some embodiments, act 501 comprises measuring a corresponding resource utilization signal at each of a plurality of nodes within a cloud computing environment that each hosts at least one corresponding VM. In an example, the measuring component 202 collects signals regarding utilization of resources 217 at the nodes 216, either directly or via the monitoring component 214. In embodiments, each corresponding resource utilization signal indicates utilization of at least one of a memory resource, a CPU resource, a disk resource, a network resource, or a platform resource. In embodiments, a platform resource is an exhaustible non-physical resource provided by a platform supporting operation of VMs (e.g., the cloud computing environment, a node, software running on the node, etc.). In one example, a platform resource is a maximum number of VMs that can be concurrently operated on any single node.

Referring to FIG. 5, in embodiments, method 500 comprises an act 502 of, using the signals identified in act 501, selecting a set of candidate hosting nodes. In some embodiments, act 502 comprises, based on each corresponding resource utilization signal, identifying a set of candidate nodes, each candidate node comprising a corresponding stranded resource that is unutilized due to utilization of a corresponding bottleneck resource at the candidate node. In an example, the candidate node selection component 203 identifies, as the set of candidate nodes (e.g., one of set 301*c*, set 301*d*, or set 301*e*), one or more of nodes 216 that currently have resources that are stranded by bottleneck resources at those nodes.

Referring to FIG. 5, in some embodiments, act 502 includes and act 502*a* of excluding hosting node(s) based on an allow or block list. In some embodiments, act 502*a* comprises identifying, from the plurality of nodes, at least one first node that is included on an allow list or a block list, and excluding the at least one first node from the set of candidate nodes. In an example, the node filtering component 204 excludes one or more of nodes 216 from further consideration by the node selection component 203 (see, e.g., step 302 of process flow 300). In embodiments, this includes the node filtering component 204 excluding one or more nodes based on an allow list (e.g., by excluding any of nodes 216 that are not identified from the allow list), or based on a block list (e.g., by excluding any of nodes 216 that are identified from the block list). Technical effects of act 502*a* include reducing a search space of further analysis by the node selection component 203, and enabling identified nodes to be excluded from operation of method 500 (e.g., to avoid VM disruptions on those nodes).

Referring to FIG. 5, in embodiments, act 502 includes and act 502*b* of calculating amounts of stranded resources at hosting nodes. In some embodiments, act 502*b* comprises calculating an amount of the corresponding stranded resource at each candidate node. In an example, the stranded node identification component 205 applies one or more rules or heuristics to signals gathered by the measuring component 202 in act 501 to determine if one or more of nodes 216 have one or more stranded resources (see, e.g., step 303 of process flow 300). Technical effects of act 502*b* include both identification of nodes that contain stranded resources, as well as quantifying a number of stranded resources at those nodes.

Referring to FIG. 5, in some embodiments, act 502 includes and act 502*c* of excluding temporarily stranded hosting node(s). In some embodiments, act 502*c* comprises determining, from the plurality of nodes, at least one second node whose corresponding stranded resource is temporarily stranded, and excluding the at least one second node from the set of candidate nodes. In an example, the temporary stranding exclusion component 206 excludes one or more nodes that are only temporarily stranding resources, such as by excluding nodes having a majority of VMs that are considered to be short-lived (see, e.g., step 304 of process flow 300). Technical effects of act 502*c* include avoiding performing VM migrations prematurely on nodes that have a majority of VMs that may be organically removed by their owner.

Referring to FIG. 5, in some embodiments, act 502 includes and act 502*d* of sorting the candidate nodes based on stranded resource amounts. In some embodiments, act 502*d* comprises sorting the set of candidate nodes based on the amount of the corresponding stranded resource at each candidate node. In an example, the node sorting component 207 sorts the set of candidate nodes by an amount of resource stranded at each node, such as by sorting the node in descending order based on the amounts calculated for each node in act 502*b* (see, e.g., step 305 of process flow 300). Technical effects of act 502*d* include producing an ordered set of candidate nodes, which can be used to prioritize VM migrations (e.g., by migrating VMs away from nodes having larger amounts of stranded resources first).

As mentioned, in embodiments, the stranded node identification component 205 considers attributes of one or more VMs that are, or that could be, allocated one or more of nodes 216. As mentioned this can include considering a plurality of VMs as a set, in addition to (or rather than) individually. Thus, in some embodiments of act 502, identifying the set of candidate nodes also includes at least one of considering a first resource configuration of a first individual VM that is queued for allocation within the plurality of nodes, considering a second resource configuration of a second individual VM that is predicted for allocation within the plurality of nodes; considering a third resource configuration of a first set of a plurality of VMs that is queued for allocation within the plurality of nodes; or considering a fourth resource configuration of a second set of a plurality of VMs that is predicted for allocation within the plurality of nodes.

It is noted that, in act 502, there is no particular ordering shown among act 502*a*, act 502*b*, act 502*c*, and act 502*d*. Thus, the description herein does not impose any particular ordering among these acts. Additionally, as indicated by broken lines, some of these acts may be optional.

Referring to FIG. 5, in embodiments, method 500 comprises an act 503 of, from the set of candidate hosting notes, identifying a set of candidate VMs. In some embodiments, act 503 comprises, from a plurality of VMs hosted at the set of candidate nodes, identifying a set of candidate VMs for migration for stranded resource recovery. In an example, the candidate VM selection component 208 identifies, as the set of candidate VMs (e.g., one of set 401*a*, set 401*b*, set 401*c*, set 401*d*, or set 401*e*), one or more VMs among the set of candidate nodes identified in act 502.

In some embodiments of act 503, the candidate VM selection component 208 selects a different set of candidate VMs for each candidate node in the set of candidate nodes. In other embodiments of act 503, the candidate VM selection component 208 selects a single set of candidate VMs across the set of candidate nodes.

Referring to FIG. 5, in some embodiments, act 503 includes and act 503*a* of excluding priority VM(s). In some embodiments, act 503*a* comprises identifying, from the plurality of VMs hosted at the set of candidate nodes, at least one first VM as being a priority VM, and excluding the at least one first VM from the set of candidate VMs. In an example, the VM filtering component 209 excludes one or more VMs hosted by the candidate node(s) from being selected as candidates for migration based on a sensitivity of those VMs (see, e.g., step 402 of process flow 400). Technical effects of act 503*a* include reducing a search space of further analysis by the act 503, and enabling sensitive VMs to be excluded from operation of method 500 (e.g., to avoid disruptions to those VMs).

Referring to FIG. 5, in some embodiments, act 503 includes and act 503*b* of excluding short-lived VM(s). In some embodiments, act 503*b* comprises identifying, from the plurality of VMs hosted at the set of candidate nodes, at least one second VM as being a short-lived VM, and excluding the at least one second VM from the set of candidate VMs. In an example, the short-lived VM exclusion component 210 excludes one or more VMs that are short-lived from being candidates for migration (see, e.g., step 403 of process flow 400). Technical effects of act 503*b* include avoiding performing migrations prematurely on VMs that may be organically removed by their owner.

Referring to FIG. 5, in embodiments, act 503 includes and act 503*c* of calculating an imbalance score for each candidate VM. In some embodiments, act 503*c* comprises calculating a score for each candidate VM based on a degree of imbalance between the corresponding stranded resource and the corresponding bottleneck resource at a candidate node hosting the candidate VM. In an example, the VM sorting component 211 applies a scoring function to each VM, in order to quantify the contribution of each individual VM to causing the stranding of a stranded resource on a node (see, e.g., step 404 of process flow 400). Technical effects of act 503*c* include quantifying an effect that individual VMs have on stranded resources.

Referring to FIG. 5, in some embodiments, act 503 includes and act 503*d* of sorting the candidate VMs based on imbalance score. In some embodiments, act 503*d* comprises sorting the set of candidate VMs based on the score for each candidate VM. In an example, the VM sorting component 211 sorts the VMs at a node (or across all candidate nodes) in based each VM's score (see, e.g., step 404 of process flow 400). Technical effects of act 503*d* include producing an ordered set of candidate VMs, which can be used to prioritize VM migrations (e.g., by migrating VMs having a larger effect on stranded resources first).

Referring to FIG. 5, in some embodiments, act 503 includes and act 503*e* of pruning the candidate VMs based on sorted order. In some embodiments, act 503*e* comprises limiting a number of candidate VMs in the set of candidate VMs based on having sorted the set of candidate VMs. In an example, the VM sorting component 211 selects the N highest scored VMs as the set of candidate VMs for migration (see, e.g., step 405 of process flow 400). Technical effects of act 503*e* include applying a limit to a number of VMs that are candidates for migration, which reduces a number of VM disruptions.

It is noted that, in act 503, there is no particular ordering shown among act 503*a*, act 503*b*, act 503*c*, act 503*d*, and act 503*e*. Thus, the description herein does not impose any particular ordering among these acts. Additionally, as indicated by broken lines, some of these acts may be optional.

Referring to FIG. 5, in embodiments, method 500 comprises an act 504 of initiating migration of candidate VM(s). In some embodiments, act 504 comprises initiating migration of at least one candidate VM in the set of candidate VMs. In an example, the VM migration orchestration component 212 initiates migration of at least one of the candidate VMs identified in act 503 away from its candidate node. For example, in embodiments initiating migration of at least one candidate VM in the set of candidate VMs includes migrating the at least one candidate VM from a first node of the plurality of nodes to a second node of the plurality of nodes. Technical effects of act 504 include recovering stranded resources at any node from which a VM is migrated (e.g., the first node).

As mentioned, some embodiments of method 500 include sorting candidate VMs based on imbalance score (act 503*d*). Thus, in some embodiments of act 504, initiating migration of at least one candidate VM in the set of candidate VMs includes selecting the at least one candidate VM for migration based on having sorted the set of candidate VMs.

As mentioned, in some embodiments, the VM migration orchestration component 212 delays migrations until node maintenance events (e.g., operating system updates, node reboots, etc.) in order to opportunistically piggybacking on those maintenance events. Thus, in some embodiments of act 504, initiating migration of at least one candidate VM in the set of candidate VMs includes delaying the migration until a node maintenance event.

As mentioned, in some embodiments an efficiency tracking component 215 tracks resource utilization efficiency among nodes 216, and the rescue system 201 uses this information to ensure that the nodes 216 are operating within target stranded resource limits. Thus, some embodiments of method 500 also include tracking a stranded resource metric across the plurality of nodes.

Accordingly, the embodiments described herein use measurements of node resources within a cloud computing environment to identify VM hosting nodes that have stranded resources, and then initiate migration of VMs causing resource bottlenecks away from these hosting nodes—thereby making these stranded resources available for VM allocations or other purposes. By doing so, the embodiments described herein automatically and proactively reduce the stranded resources within cloud computing environments.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical (i.e., hardware) storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers/nodes, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. Such embodiments may include a data processing device comprising means for carrying out one or more of the methods described herein; a computer program comprising instructions which, when the program is executed by a computer, cause the computer to carry out one or more of the methods described herein; and/or a computer-readable medium (computer storage media) comprising instructions which, when executed by a computer, cause the computer to carry out one or more of the methods described herein. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented by a computer system that includes a processor, for recovery of stranded resources within a cloud computing environment, the method comprising:

measuring a corresponding resource utilization signal at each of a plurality of nodes within a cloud computing environment that each hosts at least one corresponding virtual machine (VM);

based on each corresponding resource utilization signal, identifying a set of candidate nodes, each candidate node comprising a corresponding stranded resource that is unutilized due to utilization of a corresponding bottleneck resource at the candidate node, wherein a stranded resource is a resource of a first type on a hosting node which is prevented from being used for VM deployment due to insufficient available resource of a second type at the hosting node, a bottleneck resource is the second type of resource, and identifying the set of candidate nodes includes:

calculating an amount of the corresponding stranded resource at each candidate node;

determining, from the plurality of nodes, at least one second node whose corresponding stranded resource is temporarily stranded; and excluding the at least one second node from the set of candidate nodes;

from a plurality of VMs hosted at the set of candidate nodes, identifying a set of candidate VMs for migration for stranded resource recovery, including calculating a score for each candidate VM based on a degree of imbalance between the corresponding stranded resource and the corresponding bottleneck resource at a candidate node hosting the candidate VM; and initiating migration of at least one candidate VM in the set of candidate VMs, wherein, initiating migration of at least one candidate VM in the set of candidate VMs includes selecting the at least one candidate VM for migration based on having sorted the set of candidate VMs, and initiating migration of at least one candidate VM in the set of candidate VMs includes migrating the at least one candidate VM from a first node of the plurality of nodes to a second node of the plurality of nodes.

2. The method of claim 1, wherein each corresponding resource utilization signal indicates utilization of at least one of:

a memory resource, a central processing unit resource, a disk resource, a network resource, or a platform resource comprising an exhaustible non-physical resource provided by a platform supporting operation of VMs.

3. The method of claim 1, wherein identifying the set of candidate nodes also includes:

identifying, from the plurality of nodes, at least one first node that is included on an allow list or a block list; and excluding the at least one first node from the set of candidate nodes.

4. The method of claim 1, wherein identifying the set of candidate nodes also includes sorting the set of candidate nodes based on the amount of the corresponding stranded resource at each candidate node.

5. The method of claim 1, wherein identifying the set of candidate VMs also includes:

identifying, from the plurality of VMs hosted at the set of candidate nodes, at least one first VM as being a priority VM; and excluding the at least one first VM from the set of candidate VMs.

6. The method of claim 1, wherein identifying the set of candidate VMs also includes:

identifying, from the plurality of VMs hosted at the set of candidate nodes, at least one second VM as being a short-lived VM; and excluding the at least one second VM from the set of candidate VMs.

7. The method of claim 1, wherein identifying the set of candidate VMs also includes sorting the set of candidate VMs based on the score for each candidate VM.

8. The method of claim 7, wherein identifying the set of candidate VMs also includes limiting a number of candidate VMs in the set of candidate VMs based on having sorted the set of candidate VMs.

9. The method of claim 1, wherein initiating migration of at least one candidate VM in the set of candidate VMs includes delaying the migration until a node maintenance event.

10. The method of claim 1, wherein identifying the set of candidate nodes also includes at least one of:

considering a first resource configuration of a first individual VM that is queued for allocation within the plurality of nodes;

considering a second resource configuration of a second individual VM that is predicted for allocation within the plurality of nodes;

considering a third resource configuration of a first set of a plurality of VMs that is queued for allocation within the plurality of nodes; or considering a fourth resource configuration of a second set of a plurality of VMs that is predicted for allocation within the plurality of nodes.

11. A computer system comprising:

a processor; and a computer storage media that stores computer-executable instructions that are executable by the processor to cause the computer system to at least:

measure a corresponding resource utilization signal at each of a plurality of nodes within a cloud computing environment that each hosts at least one corresponding virtual machine (VM);

based on each corresponding resource utilization signal, identify a set of candidate nodes, each candidate node comprising a corresponding stranded resource that is unutilized due to utilization of a corresponding bottleneck resource at the candidate node, wherein a stranded resource is a resource of a first type on a hosting node which is prevented from being used for VM deployment due to insufficient available resource of a second type at the hosting node, a bottleneck resource is the second type of resource, and identifying the set of candidate nodes includes:

calculating an amount of the corresponding stranded resource at each candidate node;

determining, from the plurality of nodes, at least one second node whose corresponding stranded resource is temporarily stranded; and excluding the at least one second node from the set of candidate nodes;

from a plurality of VMs hosted at the set of candidate nodes, identify a set of candidate VMs for migration for stranded resource recovery, including calculating a score for each candidate VM based on a degree of imbalance between the corresponding stranded resource and the corresponding bottleneck resource at a candidate node hosting the candidate VM; and initiate migration of at least one candidate VM in the set of candidate VMs, wherein, initiating migration of at least one candidate VM in the set of candidate VMs includes selecting the at least one candidate VM for migration based on having sorted the set of candidate VMs, and initiating migration of at least one candidate VM in the set of candidate VMs includes migrating the at least one candidate VM from a first node of the plurality of nodes to a second node of the plurality of nodes.

12. A computer storage media that stores computer-executable instructions that are executable by a processor to cause a computer system to at least:

measure a corresponding resource utilization signal at each of a plurality of nodes within a cloud computing environment that each hosts at least one corresponding virtual machine (VM);

based on each corresponding resource utilization signal, identify a set of candidate nodes, each candidate node comprising a corresponding stranded resource that is unutilized due to utilization of a corresponding bottleneck resource at the candidate node, wherein a stranded resource is a resource of a first type on a hosting node which is prevented from being used for VM deployment due to insufficient available resource of a second type at the hosting node, a bottleneck resource is the second type of resource, and identifying the set of candidate nodes includes:

calculating an amount of the corresponding stranded resource at each candidate node;

determining, from the plurality of nodes, at least one second node whose corresponding stranded resource is temporarily stranded; and excluding the at least one second node from the set of candidate nodes;

from a plurality of VMs hosted at the set of candidate nodes, identify a set of candidate VMs for migration for stranded resource recovery, including calculating a score for each candidate VM based on a degree of imbalance between the corresponding stranded resource and the corresponding bottleneck resource at a candidate node hosting the candidate VM; and initiate migration of at least one candidate VM in the set of candidate VMs wherein, initiating migration of at least one candidate VM in the set of candidate VMs includes selecting the at least one candidate VM for migration based on having sorted the set of candidate VMs, and initiating migration of at least one candidate VM in the set of candidate VMs includes migrating the at least one candidate VM from a first node of the plurality of nodes to a second node of the plurality of nodes.

13. The computer system of claim 11, wherein each corresponding resource utilization signal indicates utilization of at least one of:

a memory resource, a central processing unit resource, a disk resource, a network resource, or a platform resource comprising an exhaustible non-physical resource provided by a platform supporting operation of VMs.

14. The computer system of claim 11, wherein identifying the set of candidate nodes also includes:

identifying, from the plurality of nodes, at least one first node that is included on an allow list or a block list; and excluding the at least one first node from the set of candidate nodes.

15. The computer system of claim 11, wherein identifying the set of candidate nodes also includes sorting the set of candidate nodes based on the amount of the corresponding stranded resource at each candidate node.

16. The computer system of claim 11, wherein identifying the set of candidate VMs also includes:

identifying, from the plurality of VMs hosted at the set of candidate nodes, at least one first VM as being a priority VM; and excluding the at least one first VM from the set of candidate VMs.

17. The computer system of claim 11, wherein identifying the set of candidate VMs also includes:

identifying, from the plurality of VMs hosted at the set of candidate nodes, at least one second VM as being a short-lived VM; and excluding the at least one second VM from the set of candidate VMs.

18. The computer system of claim 11, wherein identifying the set of candidate VMs also includes sorting the set of candidate VMs based on the score for each candidate VM.

19. The computer system of claim 11, wherein initiating migration of at least one candidate VM in the set of candidate VMs includes delaying the migration until a node maintenance event.

20. The computer system of claim 11, wherein identifying the set of candidate nodes also includes at least one of:

considering a first resource configuration of a first individual VM that is queued for allocation within the plurality of nodes;

considering a second resource configuration of a second individual VM that is predicted for allocation within the plurality of nodes;

considering a third resource configuration of a first set of a plurality of VMs that is queued for allocation within the plurality of nodes; or considering a fourth resource configuration of a second set of a plurality of VMs that is predicted for allocation within the plurality of nodes.

* * * * *